(12) United States Patent
Choi et al.

(10) Patent No.: US 7,365,903 B2
(45) Date of Patent: Apr. 29, 2008

(54) APPARATUS AND METHOD FOR ALL-OPTICAL CONTROL OF GAIN AND GAIN FLATTENING ON AN OPTICAL AMPLIFIER

(75) Inventors: Bo Hun Choi, Daejeon (KR); Sang Soo Lee, Daejeon (KR); Chang Bong Kim, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/601,817

(22) Filed: Nov. 20, 2006

(65) Prior Publication Data

US 2007/0133084 A1   Jun. 14, 2007

(30) Foreign Application Priority Data

Dec. 8, 2005 (KR) .............. 10-2005-0120047
Mar. 9, 2006 (KR) .............. 10-2006-0022259

(51) Int. Cl.
*H01S 3/00* (2006.01)

(52) U.S. Cl. .................. 359/337.1; 359/337.4
(58) Field of Classification Search ........ 359/337.1, 359/337.11, 337.4
See application file for complete search history.

(56) References Cited

U.S. PATENT DOCUMENTS

| | | | |
|---|---|---|---|
| 5,598,491 A * | 1/1997 | Ohya et al. ............. 385/24 |
| 6,175,436 B1 | 1/2001 | Jackel | |
| 6,341,033 B1 * | 1/2002 | Yadlowsky ............. 359/337.2 |
| 6,356,385 B1 | 3/2002 | Digonnet et al. | |
| 6,356,685 B1 | 3/2002 | Kim et al. | |
| 6,421,170 B1 | 7/2002 | Krol et al. | |
| 6,480,329 B2 | 11/2002 | Sugaya et al. | |
| 6,738,185 B2 | 5/2004 | Nakaji | |
| 6,888,670 B2 * | 5/2005 | Oh et al. ............. 359/334 |
| 6,903,867 B2 | 6/2005 | Ng et al. | |

FOREIGN PATENT DOCUMENTS

| | | |
|---|---|---|
| JP | 10-294510 | 11/1998 |
| JP | 11-017258 | 1/1999 |
| JP | 2000-031573 | 1/2000 |
| KR | 1020010010768 | 2/2001 |

OTHER PUBLICATIONS

Muhidin Lelic et al.; "Smart EDFA with Embedded Control"; 0-7803-715-4/01/$10.00© 2001 IEEE; pp. 419-420.

* cited by examiner

*Primary Examiner*—Mark Hellner
(74) *Attorney, Agent, or Firm*—Lowe Hauptman Ham & Berner LLP (57) ABSTRACT

Provided is an apparatus and method for all-optically controlling both a gain and a gain flattening. The apparatus includes: a first amplifier automatically controlling a gain of the apparatus through a feedback loop while amplifying a received optical signal; a fixed gain flattening unit receiving the amplified optical signal from the first amplifier and compensating for the gain according to a wavelength of the received optical signal; and a second amplifier automatically controlling the gain through a feedback loop while amplifying the optical signal input from the fixed gain flattening unit. Accordingly, even if the number of channels of an input WDM optical signal varies, both of a gain and a gain flattening can be all-optically controlled.

10 Claims, 7 Drawing Sheets

APPARATUS AND METHOD FOR ALL-OPTICAL CONTROL OF GAIN AND GAIN FLATTENING ON AN OPTICAL AMPLIFIER

CROSS-REFERENCE TO RELATED PATENT APPLICATION

This application claims the benefit of Korean Patent Application No. 10-2005-0120047, filed on Dec. 8, 2005 and No. 10-2006-0022259, filed on Mar. 9, 2006, in the Korean Intellectual Property Office, the disclosure of which is incorporated herein in its entirety by reference.

BACKGROUND OF THE INVENTION

1. Field of the Invention

The present invention relates to an optical amplifier, and more particularly, to an apparatus and method for controlling an all-optical gain and gain flattening.

2. Description of the Related Art

A general erbium-doped fiber amplifier (EDFA) has a constant gain regardless of the intensity of an input signal in a range where the intensity of the input signal is low. However, if the intensity of the input signal is greater than a specific value, the gain of an optical amplifier is inversely proportional to the intensity of the input signal. Furthermore, this gain level of the optical amplifier varies according to the input signal wavelength and so also gain flattening intended in order to give the same gain to all different wavelength signals is broken due to input signal power variation.

An intelligent function for compensating for the variation of gain or gain flattening according to the variation of an input condition of wavelength division multiplexing (WDM) signals is required of the optical amplifier.

To satisfy this function, an electronic control method and an all-optical method have been suggested. Similar to an automatic gain control (AGC) method in an electrical circuit, the electronic control method is a method of adjusting the intensity of pump energy by sensing the intensity of an input optical signal or the intensity of an output optical signal in a receiver, calculating the sensing result, and outputting the calculation result to an optical amplifier.

Compared to the electronic control method, the all-optical method is relatively simple and has a high gain control speed using friendly optical component technology. However, since a considerable amount of optical energy of an optical amplifier is used not for an input signal amplification but for a lasing light for an all-optical gain controlled (AOGC) function, the all-optical method has a low gain compared to a case where the AOGC function is not used and has a limitation in being able to keep a widen a dynamic range in which the AOGC function is maintained in an input signal intensity domain. Additionally this low gain results in worse noise figure.

Since a general AOGC method has a narrow dynamic range, a general AOGC method cannot be applied to an input signal having high intensity, e.g., an input signal using WDM channels in a wide wavelength band, which use all of the C-band (1530 nm-1560 nm). Thus, although a general AOGC method basically has a characteristic of a fixed gain slope, a gain and gain flattening cannot be automatically controlled together due to the low gain and the narrow dynamic range of the general AOGC method.

SUMMARY OF THE INVENTION

The present invention provides an apparatus and a method for controlling a gain, widening a dynamic range in which the controlled gain is maintained, and increasing a total gain using an optical amplifier of a two-staged amplification structure using an all-optical gain control (AOGC) method in each stage, and for simultaneously controlling an automatic gain flattening without an electrical control when a wavelength division multiplexing (WDM) signal using the entire C-band is input.

The present invention also provides an amplifier for constantly maintaining low noise figure while automatically controlling both a gain and a gain flattening.

According to an aspect of the present invention, there is provided an apparatus for controlling an all-optical gain and an all-optical gain flattening, the apparatus comprising: a first amplifier amplifying a received optical signal and automatically controlling a gain through a feedback loop; a fixed gain flattening unit receiving the amplified optical signal from the first amplifier and compensating for the gain according to a wavelength of the received optical signal; and a second amplifier amplifying the optical signal input from the fixed gain flattening unit and automatically controlling the gain through a feedback loop.

The first amplifier may comprise: an amplifying unit amplifying the received optical signal; an optical coupler coupling a lasing light formed by the feedback loop into a signal transmission path in the feedback loop; and an optical wavelength selective coupler coupling back the lasing light from the signal transmission path into the feedback loop.

The second amplifier may comprise: an amplifying unit amplifying the received optical signal; an optical coupler coupling a lasing light formed by the feedback loop into a signal transmission path in the feedback loop; and an optical wavelength selective coupler coupling back the lasing light from the signal transmission path into the feedback loop.

According to another aspect of the present invention, there is provided a method of controlling an all-optical gain and an all-optical gain flattening, the method comprising: (a) amplifying a received optical signal and automatically controlling a gain through a feedback loop; (b) receiving the optical signal amplified in operation (a) and changing the gain according to a wavelength of the received optical signal; and (c) amplifying the optical signal input from operation (b) and automatically controlling the gain through a feedback loop.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention with unnecessary detail.

Figure 1:
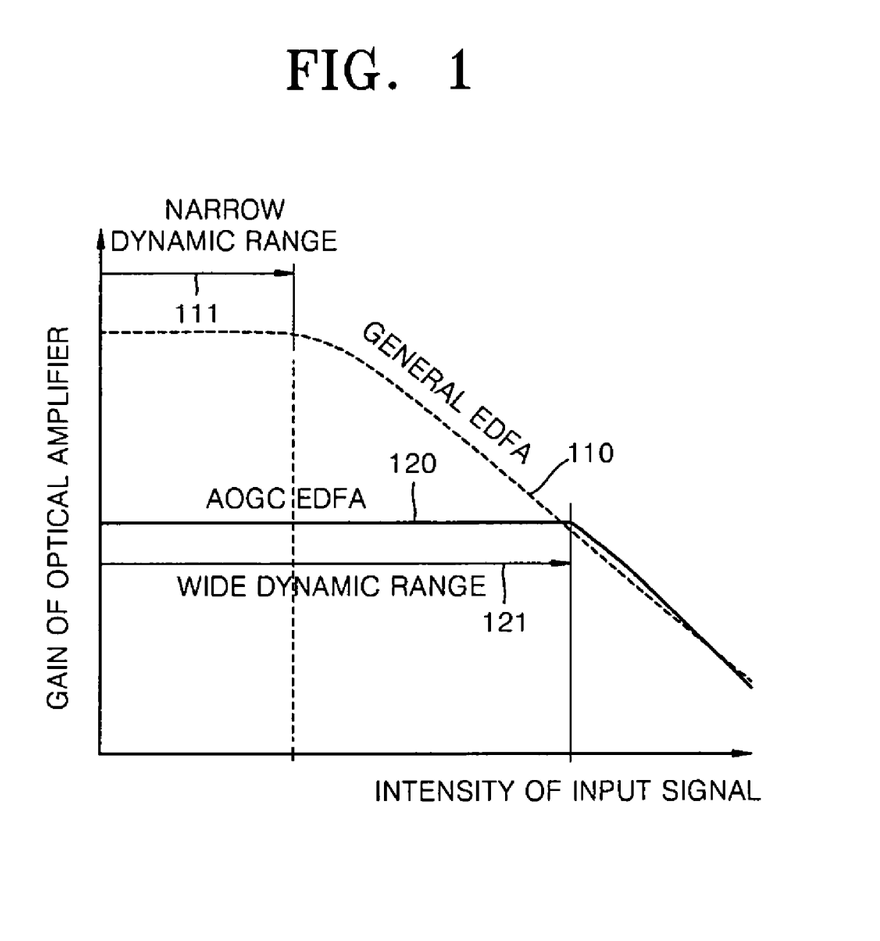
FIG. 1 is a graph showing a gain characteristic according to the intensity of an input signal in optical amplifiers.

FIG. 1 is a graph showing a gain characteristic according to the intensity of an input signal in optical amplifiers.

As shown in a gain curve 110 of a general erbium-doped fiber amplifier (EDFA) illustrated in FIG. 1, the general EDFA has a constant gain regardless of the intensity of an input signal in a range where the intensity of the input signal is low. However, a gain of an optical amplifier is inversely proportional to the intensity of the input signal if the intensity of the input signal is greater than a specific value.

This characteristic of the gain curve 110 of the general EDFA causes that the gain of the optical amplifier varies according to the intensity of the input signal, i.e., that the gain is not constantly maintained in the optical amplifier whose gain characteristic is determined according to the total intensity of an input optical signal.

As shown in a gain curve 120 of the optical amplifier using an all-optical gain control (AOGC) function for the present invention, a gain of the AOGC amplifier is rarely influenced much according to a signal input to the AOGC amplifier as compared to the general EDFA.

According to the gain curve 120 of the AOGC amplifier, a dynamic range 121 in which a constant gain of the optical amplifier is maintained regardless of the variation of intensity of an input signal is considerably wider as compared to the general EDFA.

Figure 2:
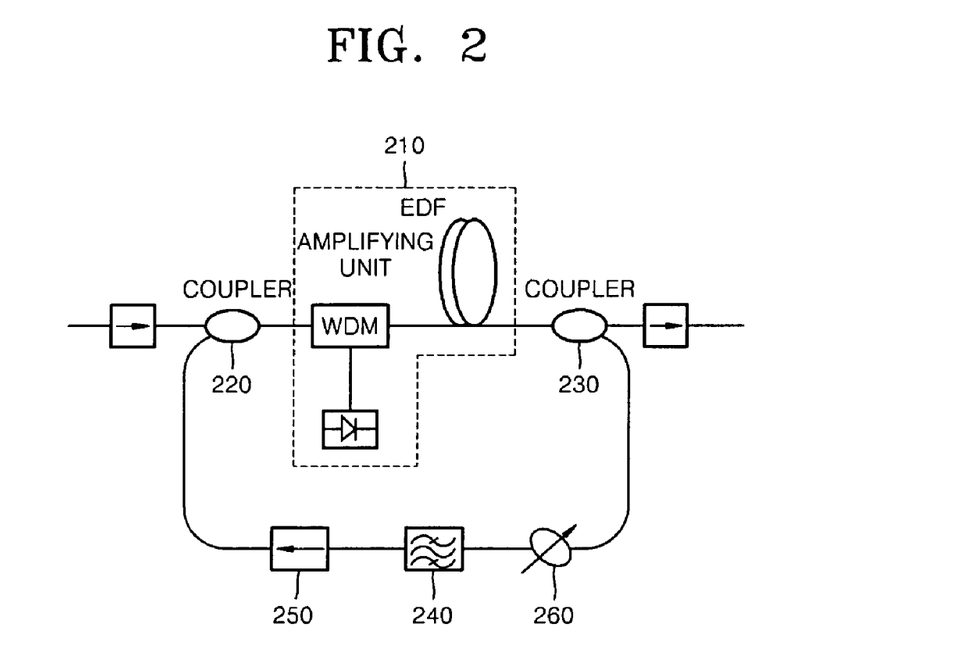
FIG. 2 is a configuration for an AOGC function in an optical amplifier according to an embodiment of the present invention.

FIG. 2 is a configuration of one of previous AOGC amplifiers.

Referring to FIG. 2, the AOGC amplifier includes an amplifying unit 210 including an EDF and WDM combiner and a pump laser diode (LD), optical power couplers 220 and 230, an optical signal narrow band pass filter 240, an optical isolator 250, and a variable optical isolator 260.

The AOGC amplifier forms an optical signal feedback loop by adding the optical power couplers 220 and 230 to both ends of the amplifying unit 210.

The optical signal narrow band pass filter 240 passes only a specific wavelength of an amplified spontaneous emission (ASE) of the EDF, and the optical isolator 250 allows the ASE to rotate in only one direction around the feedback loop. Thus, this loop structure forms a laser resonator, and a light beam of the wavelength rotating around the feedback loop becomes a lasing light.

The variable optical isolator 260 determines the intensity of the lasing light by adjusting lasing light loss in the formed laser resonator.

The loop structure illustrated in FIG. 2 is only one example of an amplifier using the AOGC method, and besides, the amplifier can be manufactured using an optical fiber grating filter and other components.

Figure 3A:
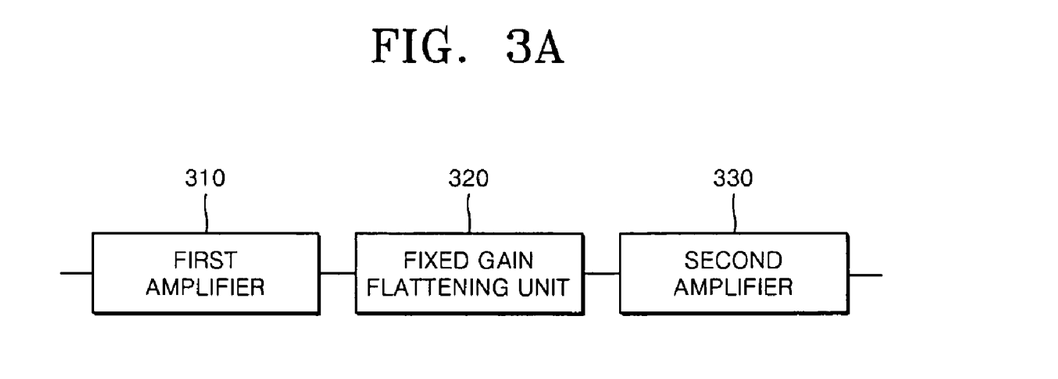
FIGS. 3A and 3B are a block diagram and a detailed configuration, respectively, of an optical amplifier according to an embodiment of the present invention.
Figure 3B:
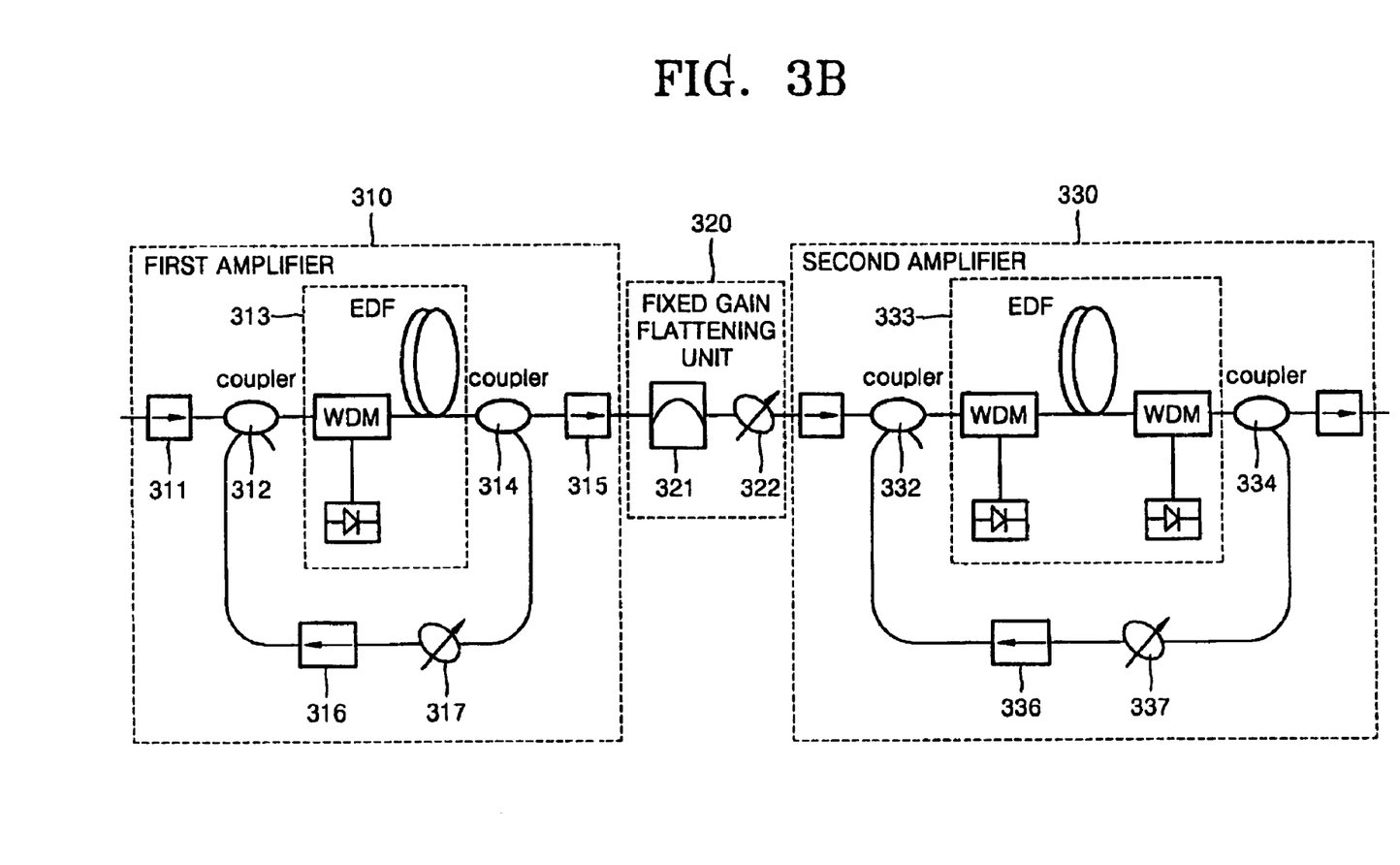

FIGS. 3A and 3B are a block diagram and a detailed configuration, respectively, of the proposed optical amplifier according to an embodiment of the present invention.

Referring to FIGS. 3A and 3B, the optical amplifier includes a first amplifier 310, a second amplifier 330, and a fixed gain flattening unit 320.

The first amplifier 310 amplifies an input optical signal and outputs the amplified optical signal to the fixed gain flattening unit 320, and has a feedback loop for a lasing light. The first amplifier 310 includes a lasing light coupler 314, an amplifying unit 313, a lasing light power coupler 312, an optical isolator 316, and a variable attenuator 317.

The lasing light coupler 314 couples a lasing light into the feedback loop from a transmission signal path. This coupler 314 induces lasing by allowing only a specific wavelength among an ASE output from an EDF of the amplifying unit 313 to rotate through the feedback loop. The lasing light coupler 314 can be implemented by an optical channel add/drop filter or by combining an optical power splitter and a band pass filter. However, the present invention is not limited thereto.

The amplifying unit 313 amplifies the optical signal input to the first amplifier 310.

The lasing light power coupler 312 feeds back the separated lasing light by the lasing light coupler 314 into the amplifying unit 313. The lasing light power coupler 312 can be implemented by an optical power combiner/splitter. However, the present invention is not limited thereto.

The optical isolator 316 selects a rotation direction of the feedback loop, and the variable attenuator 317 adjusts the intensity of the lasing light of the feedback loop. The first amplifier 310 includes the AOGS function by forming the feedback loop, and the value of an automatically controlled gain can be adjusted by the variable attenuator 317.

The second amplifier 330 includes a lasing light power coupler 332, an amplifying unit 333, a lasing light coupler 334, an optical amplifier 336, and a variable attenuator 337. The second amplifier 330 amplifies an optical signal input from the fixed gain flattening unit 320 and includes a feedback loop for a lasing light.

According to the current embodiment of the present invention, the first amplifier 310 has a forward pumping structure, and the second amplifier 330 has a bi-directional pumping structure. This 2-step amplifier structure is designed to improve gain and reduce noise figure of the optical amplifier. Since a first-step noise figure significantly influences the noise figure of the overall optical amplifier in the 2-step amplifier structure, the first amplifier 310 has a forward pumping structure, and the noise figure of the overall optical amplifier can be improved. In addition, when the second amplifier 330 has a bi-directional pumping structure, a total gain can be improved. However, the present invention is not limited thereto. Since components of the second amplifier 330, which correspond to components of the first amplifier 310, are the same as or similar to the components of the first amplifier 310, descriptions thereof are omitted.

The fixed gain flattening unit 320 includes a fixed gain flattening filter 321 and a variable attenuator 322.

The fixed gain flattening filter 321 has insertion losses that are different at each wavelength, thereby changing a gain slope according to the wavelength of the optical signal input from the first amplifier 310. Here, the changed gain slope value is constant and used to compensate for a gain slope formed by the first amplifier 310 and the second amplifier 330.

The variable attenuator 322 compensates for the intensity of the optical signal output from the fixed gain flattening unit 320.

The fixed gain flattening unit 320 can further include a component having another function, which can be used with an amplifier. That is, since the fixed gain flattening unit 320 has a margin in insertion loss, the fixed gain flattening unit 320 can further include, for example, a dispersion compensation unit or an optical add/drop filter.

An influence of insertion loss provided by the fixed gain flattening unit 320 is minimized by disposing the fixed gain flattening unit 320 between the first amplifier 310 and the second amplifier 330.

Figure 4:
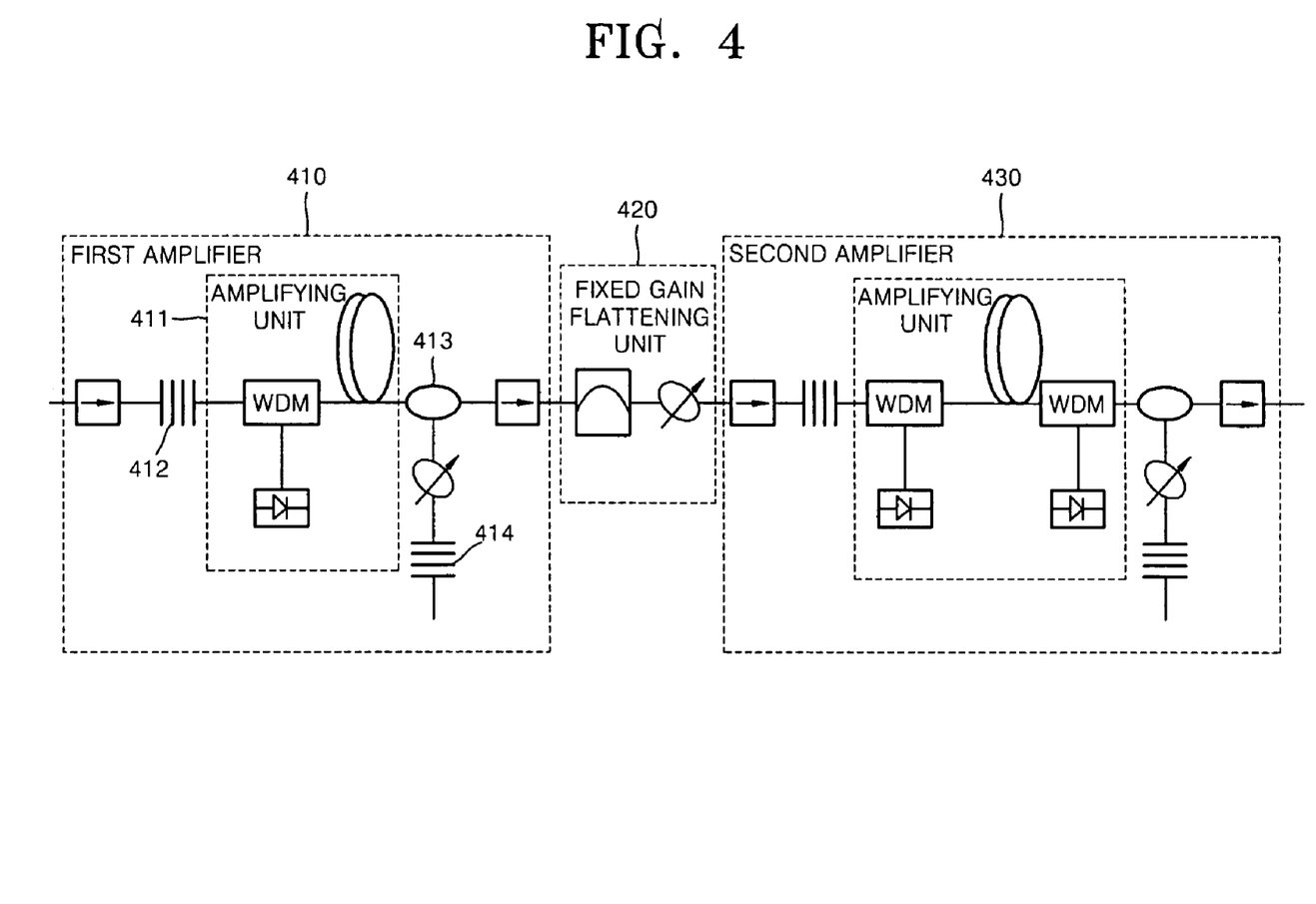
FIG. 4 is a detailed configuration of an optical amplifier according to another embodiment of the present invention.

FIG. 4 is a detailed configuration of an optical amplifier according to another embodiment of the present invention.

Referring to FIG. 4, the optical amplifier includes the first amplifier 410, the second amplifier 430, and a fixed gain flattening unit 420. The components illustrated in FIG. 4 are similar to or the same as the components illustrated in FIG. 3B, but a loop for generating a lasing light in each of the first amplifier 410 and the second amplifier 430 is implemented with various replaceable components. That is, FIG. 4 illustrates an embodiment implemented using a fiber Bragg grating (FBG) pair.

In the first amplifier 410, a laser resonator for generating a lasing light is formed by disposing an FBG 412 for reflecting a lasing light on the left of an amplifying unit 411 and disposing another FBG 414 with an optical power splitter 413 on the right of the amplifying unit 411. The FBGs reflect only a lasing light and don't disturb the transmission signal. The second amplifier 430 has the same laser resonator structure as the first amplifier 410.

Figure 5:
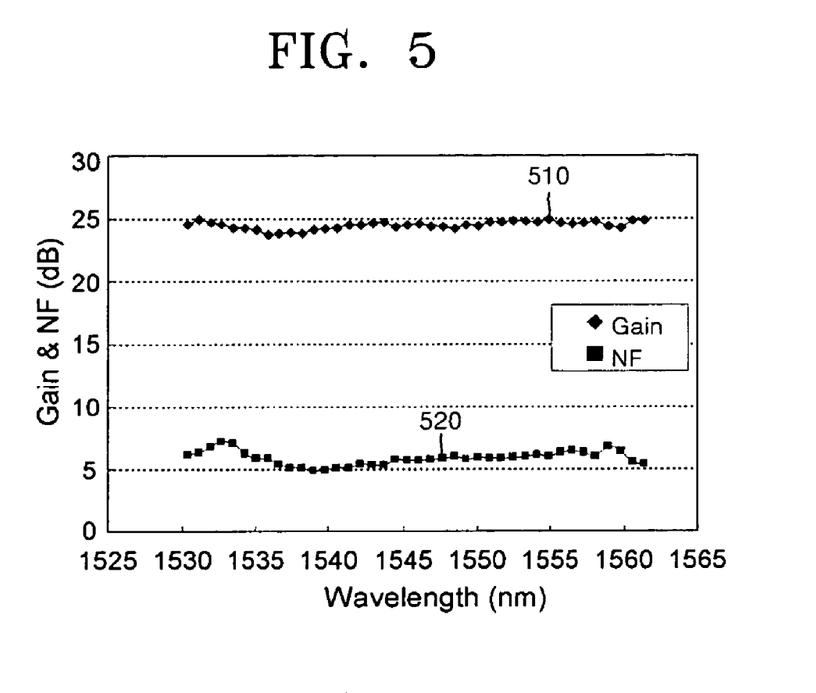
FIG. 5 is a graph showing gain and noise figure according to wavelength variation in an optical amplifier according to an embodiment of the present invention.

FIG. 5 is a graph showing gain and noise figure according to wavelength variation in an optical amplifier according to an embodiment of the present invention.

For a WDM input signal applied to the optical amplifier referred to in FIG. 5, 40 channels between 1530.33 nm and 1561.42 nm with 100 GHz channel spacing and −20 dBm light intensity per channel are used. In FIG. 5, a gain 510 of the optical amplifier is 25 dB and does not vary much with a deviation of less than 1 dB. A noise FIG. 520 of the optical amplifier has a maximum noise value of 7.1 dB.

Figure 6:
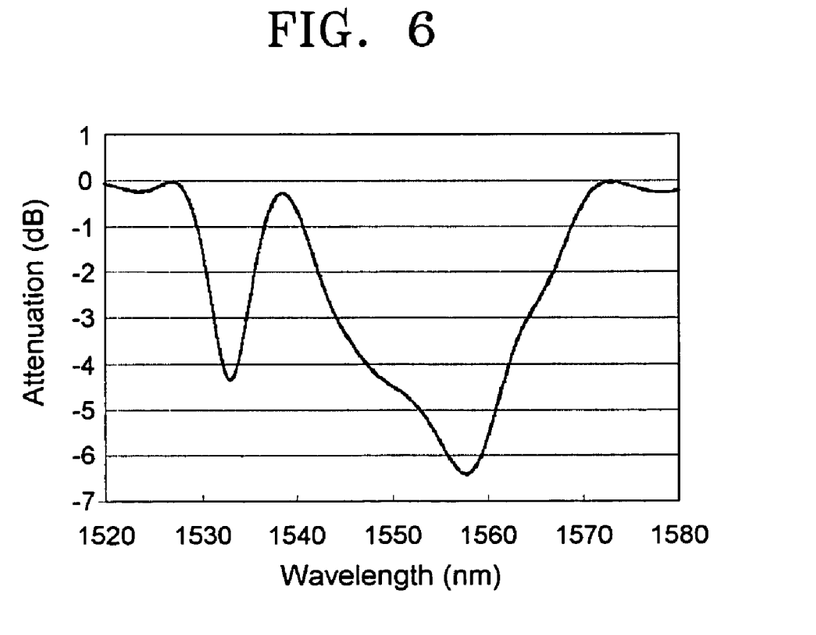
FIG. 6 is a graph showing an insertion loss spectrum of a fixed gain flattening filter used for the optical amplifier referred to in FIG. 5.

FIG. 6 is a graph showing an insertion loss spectrum of a fixed gain flattening filter used in the optical amplifier referred to in FIG. 5.

Figure 7:
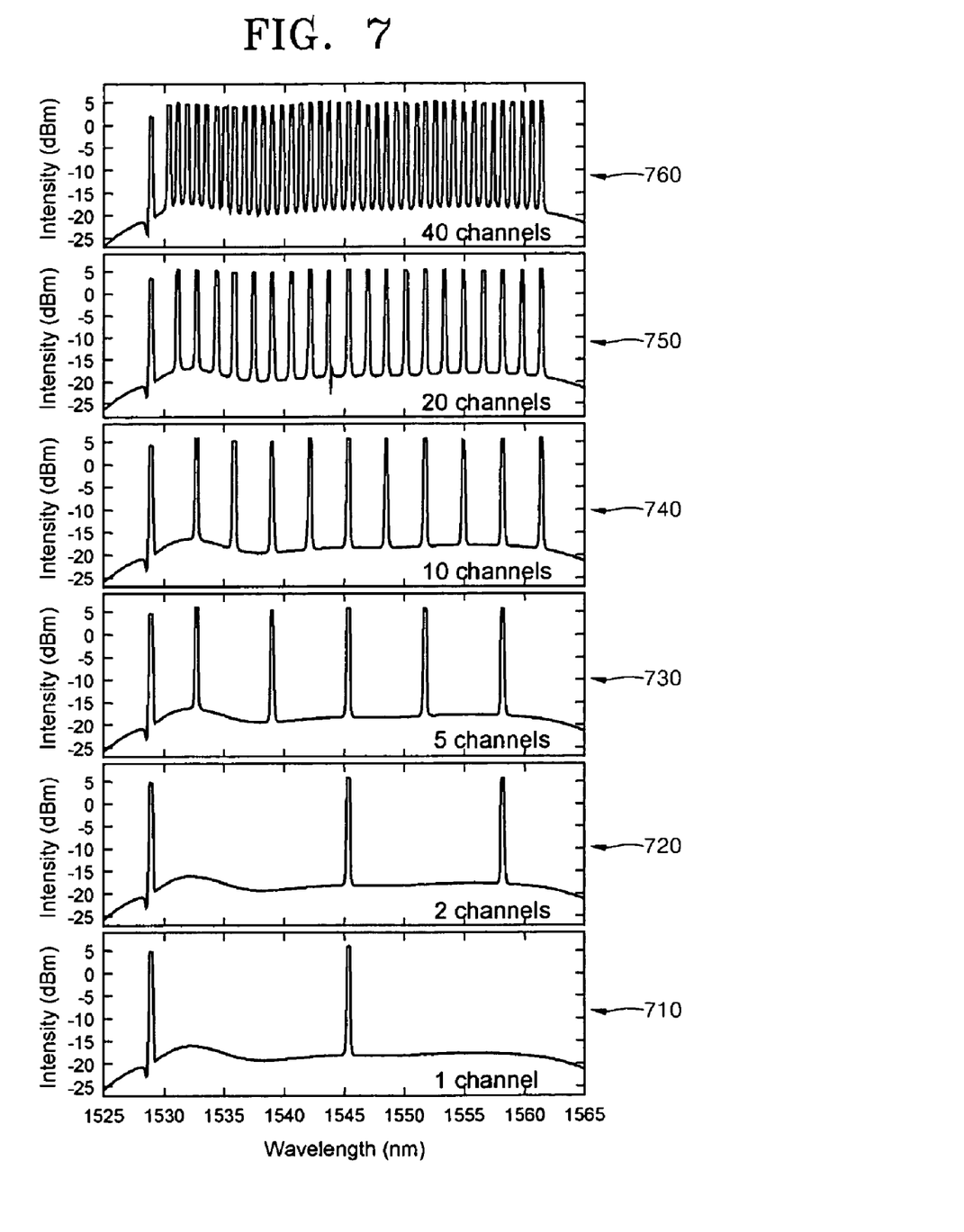
FIG. 7 is a series of graphs showing spectra of an output signal of an optical amplifier according to an embodiment of the present invention when the number of channels of an input optical signal varies between one and 40 channels.

FIG. 7 is a series of graphs showing spectra 710 through 760 of output signals of an optical amplifier according to an embodiment of the present invention when the number of channels of input optical signals changed to 1, 2, 5, 10, 20, and 40, respectively.

In each of the spectra 710 through 760, an optical output signal on the left most part of the wavelength axis is not an optical transmission signal but a lasing light used for an AOGC function. In FIG. 7, a 1528 nm wavelength light is commonly used as the lasing light in each of the first amplifier and the second amplifier.

As illustrated in FIG. 7, even when the number of channels of the input optical signal varies between 1 and 40, the output light intensity of individual channels does not change, and furthermore, a gain slope according to wavelength is not affected at all. That is, both the gain and the gain flattening are automatically controlled.

Figure 8:
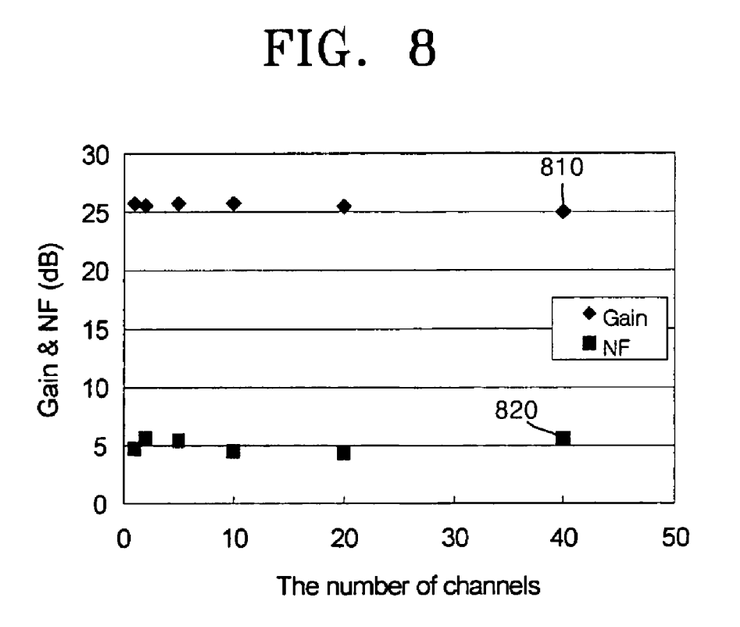
FIG. 8 is a graph showing gain and noise figure of a remaining optical signal channel regardless of the variation of the number of channels of the input optical signal, as a result of FIG. 7.

FIG. 8 is a graph showing gain and noise figure of a survival channel among input optical signals regardless of the variation of the number of channels of the input optical signals.

This survival channel measured in FIG. 8 appears in the middle of the spectrum 710 in FIG. 7, and has a wavelength of 1542.32 nm, which is an intermediate value of the C-band. In FIG. 8, the x-axis indicates the number of channels of an input optical signal, which varies from 1 to 40, i.e., from −20 dBm to −2 dBm in terms of the intensity of the input optical signals. In this case, it can be observed from the y-axis that a gain 810 has a constant value of 25 dB and a noise figure 820 has a constant value of 5.5 dB. It means that the characteristics of the amplifier are well controlled.

Figure 9:
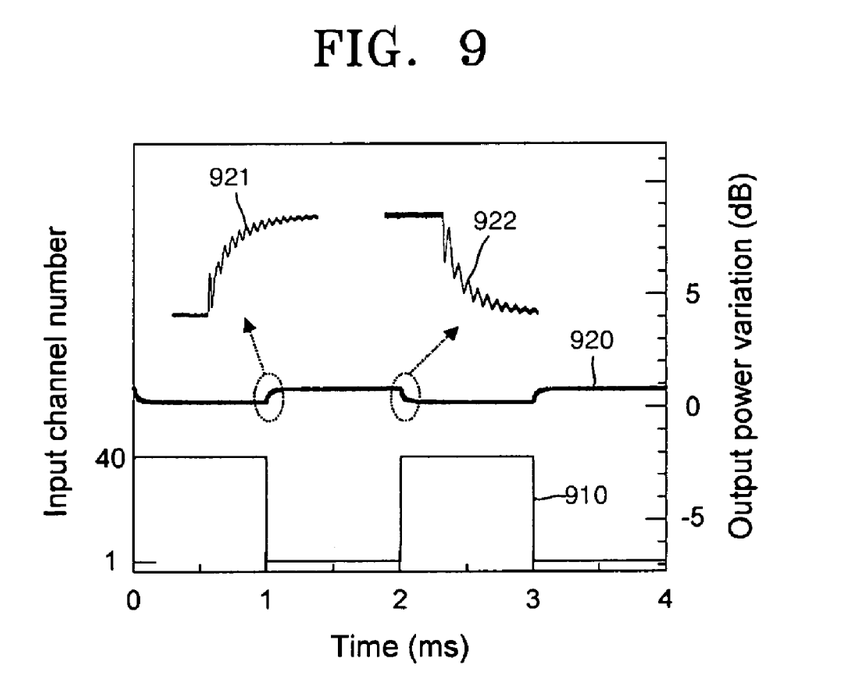
FIG. 9 is a graph showing the variation of a gain of remaining optical signal channel with respect to time regardless of the variation of the number of channels of the input optical signal.

FIG. 9 is a graph showing the output power variation of the survival channel with respect to time while the input signal intensity 910 of an optical amplifier varies between 1 to 40 channels with a cycle of 500 Hz. This corresponds to the case that all 40 channels of input optical signals except for the survival channel are periodically turned on and off as the worst scenario for very rapid signal add/drop.

That is, the intensity of the output signal 920 according to the variation of the input signal 910 over time is illustrated. As illustrated in FIG. 9, since the intensity of the output signal 920 varies only slightly, it can be seen that the AOGC function operates normally.

Furthermore, it is seen that a transient effect is insignificant since overshooting or undershooting, which can be generated at a short time, is insignificant and within a stable range as illustrated by the magnified points 921 and 922 of the intensity of the output signal (channel) 920 according to time when 39 channels out of the 40 channels are dropped or added.

The invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to the present invention, even if the number of channels of input WDM optical signals varies, gain and gain flattening are automatically adjusted.

That is, through a 2-step amplifier structure using an AOGC method, a dynamic range, which is an input range enabling an AGC, can be widened, and simultaneously gain and gain flattening of WDM signals using the entire C-band can be automatically adjusted.

In addition, the 2-step amplifier structure using the AOGC method increases the gain and maintains a constant low noise figure in the dynamic range.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for all-optically controlling gain and gain flattening, the apparatus comprising:
   a first amplifier configured to amplify a received optical signal, output the amplified signal along an optical transmission path, and automatically control a gain through a first lasing light feedback loop;
   a fixed gain flattening unit configured to receive the amplified optical signal from the first amplifier and compensate for the gain according to a wavelength of the received optical signal; and
   a second amplifier configured to amplify the optical signal input from the fixed gain flattening unit and automatically control the gain through a second lasing light feedback loop;
   wherein the first amplifier comprises:
      a first amplifying unit that amplifies the optical signal received by the first amplifying unit;
      a first lasing light coupler that couples a lasing light into the first feedback loop from the optical signal transmission path; and
      a first lasing light power coupler that feeds lasing light formed by the feedback loop back into the optical transmission path;
   wherein the second amplifier comprises:
      a second amplifying unit that amplifies the optical signal received by the second amplifying unit;
      a second lasing light coupler that couples a lasing light into the second feedback loop from the optical signal transmission path; and
      a second lasing light power coupler that feeds lasing light formed by the second feedback loop back into the optical signal transmission path;
   wherein the fixed gain flattening unit comprises a variable attenuator that adjusts the intensity of the output signal from the first amplifier; and
   wherein each of the lasing light power couplers and the lasing light couplers includes an optical power splitter in combination with a band pass filter.

2. The apparatus of claim 1, wherein the first amplifier further comprises an optical isolator fixing a direction of the feedback loop.

3. The apparatus of claim 1, wherein the second amplifier further comprises an optical isolator fixing a direction of the feedback loop.

4. The apparatus of claim 1, wherein the first amplifier further comprises an optical isolator adjusting the intensity of the lasing light formed by the feedback loop.

5. The apparatus of claim 1, wherein the second amplifier further comprises an optical isolator adjusting the intensity of the lasing light formed by the feedback loop.

6. The apparatus of claim 1, wherein each of the lasing light power coupler and the lasing light coupler is implemented by an optical add/drop filter.

7. The apparatus of claim 1, wherein the lasing light power coupler and the lasing light coupler constitute a filter pair reflecting a specific wavelength in the left and right of the amplifying unit.

8. A method of all-optically controlling an gain and gain flattening, the method comprising:
   (a) amplifying a received optical signal and automatically controlling a gain through a feedback loop;
   (b) receiving the optical signal amplified in operation (a) and compensating for the gain according to a wavelength of the received optical signal; and
   (c) amplifying the optical signal input from operation (b) and automatically controlling the gain through a feedback loop;
   wherein (a) comprises:
      (a1) amplifying the received optical signal;
      (a2) coupling a lasing light into the feedback loop from a signal transmission path; and
      (a3) coupling back the lasing light formed by the feedback loop into the signal transmission path; and
   wherein (c) comprises:
      (c1) amplifying the received optical signal;
      (c2) coupling a lasing light from a signal transmission path into the feedback loop; and
      (c3) coupling back the lasing light formed by the feedback loop into the signal transmission path.

9. The method of claim 8, wherein operation (a) further comprises (a4) controlling a circulation direction of the lasing light formed by the feedback loop.

10. The method of claim 8, wherein operation (c) further comprises (c4) controlling a circulation direction of the lasing light formed by the feedback loop.

* * * * *